United States Patent [19]

Hoagland et al.

[11] Patent Number: 4,533,426

[45] Date of Patent: Aug. 6, 1985

[54] LABELING MACHINE

[75] Inventors: Frank V. N. Hoagland, Palm Harbor, Fla.; Agostino J. Aquino, Patterson, N.J.

[73] Assignee: Nabisco Brands, Inc., Parsippany, N.J.

[21] Appl. No.: 435,611

[22] Filed: Oct. 20, 1982

[51] Int. Cl.[3] .......................... B29C 17/00; B32B 3/04; B31F 5/00; B65H 29/00

[52] U.S. Cl. .................................... 156/492; 156/475; 156/477.1; 156/479; 156/482; 156/486; 156/540; 156/556

[58] Field of Search ............. 156/475, 477.1, 478–479, 156/482, 486, 492, DIG. 25, DIG. 28, DIG. 33, DIG. 27, 358, 540, 556

[56] References Cited

U.S. PATENT DOCUMENTS

| | | | |
|---|---|---|---|
| 2,571,103 | 10/1951 | Belcher et al. | 156/477.1 |
| 2,854,164 | 9/1958 | Triolo | 156/477.1 |
| 3,513,058 | 5/1970 | Penick | 156/479 |
| 3,938,698 | 2/1976 | McDavid, Jr. et al. | 156/566 |
| 4,059,477 | 11/1977 | Wesley | 156/488 |
| 4,160,687 | 7/1979 | Spear | 156/479 |
| 4,181,561 | 1/1980 | Sevagnoli | 156/475 |
| 4,321,103 | 3/1982 | Lindstrom et al. | 156/DIG. 33 |

FOREIGN PATENT DOCUMENTS 0053705 10/1981 European Pat. Off. .

*Primary Examiner*—Edward Kimlin
*Assistant Examiner*—Merrell C. Cashion, Jr.
*Attorney, Agent, or Firm*—Richard Kornutik

[57] ABSTRACT

A machine for applying labels to the fin sealed ends of packages carried by a bucket conveyor in which the labels are cut from a web of printed roll stock placed on the fin seals and held in place by a hold down conveyor while the labels are folded by dynamic plows in conjunction with a series of guide bars.

10 Claims, 8 Drawing Figures

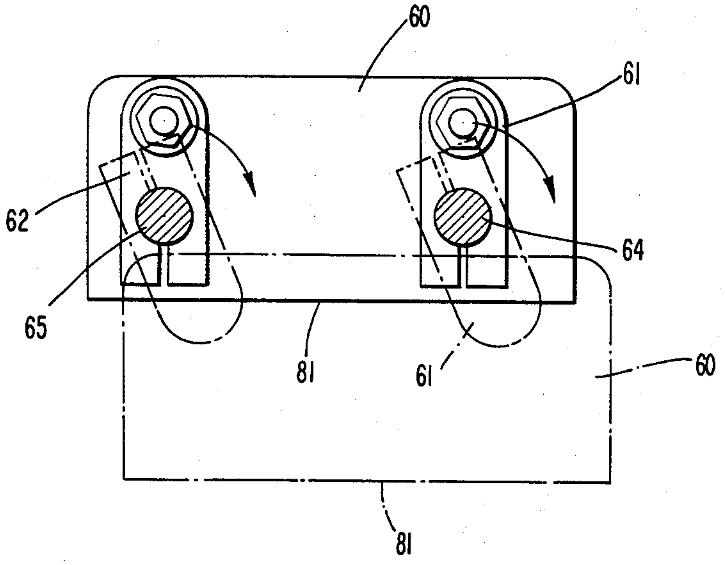
Fig. 5
Fig. 6
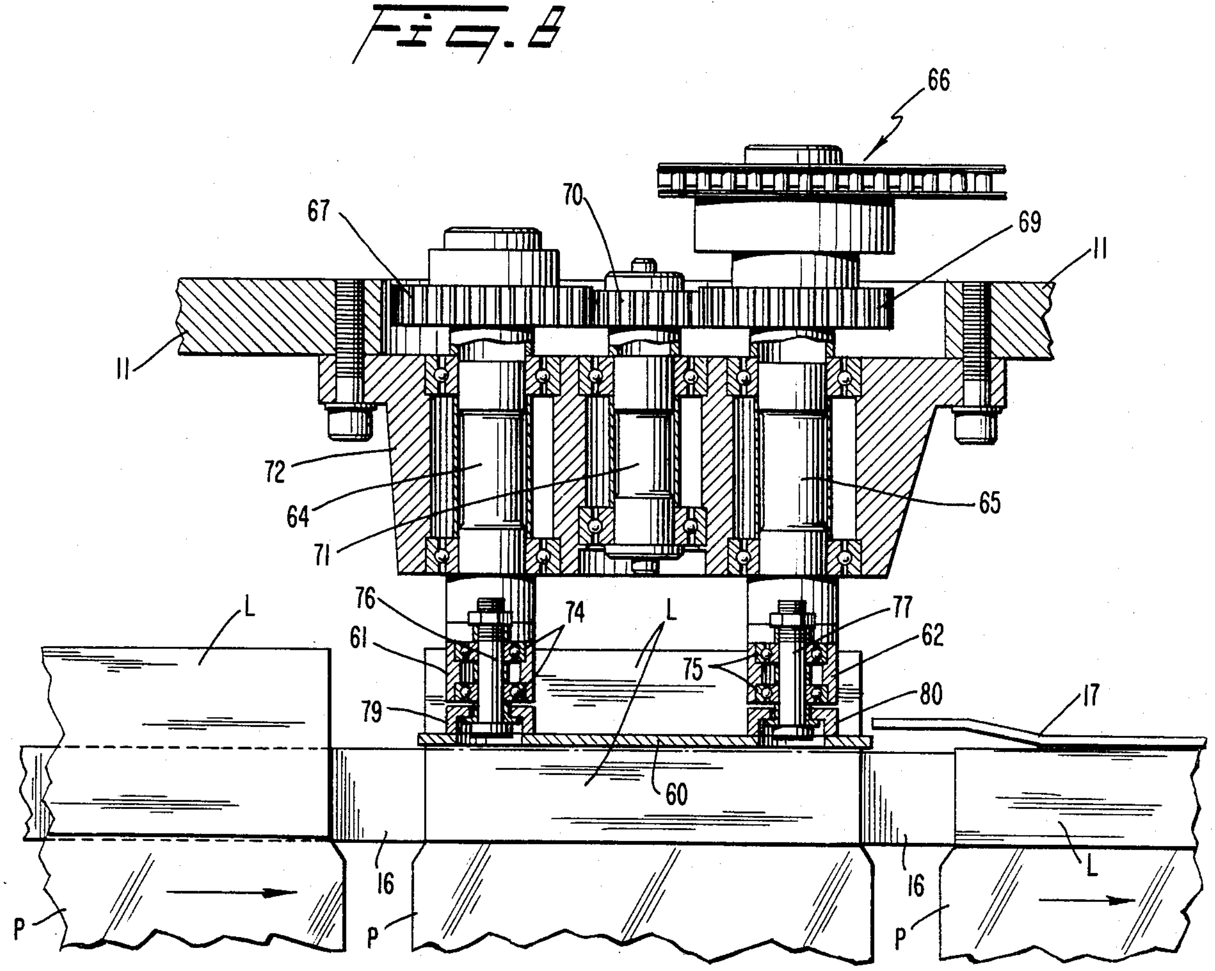

LABELING MACHINE

BACKGROUND OF THE INVENTION

The present invention relates to packaging and more particularly, to machinery for applying labels to packages.

A common type of cookie package is formed by folding a sheet of thin plastic packaging material into a sleeve, sliding a tray holding several rows of cookies into the sleeve, and forming fin seals on each end of the sleeve. Commonly, one of the fin seals is folded against the end of the package and heat sealed in place, while the other fin seal is covered by a label. The label, which conventionally is of thin paper, is folded over the outer edge of the fin seal and covers both surfaces of the sealed area. The label normally carries some product identifying legend, but its prime function is to provide a convenient location for the retailer to place the package price.

In the prior art machines, the folding of the labels over the fin sealed end of the package is accomplished by conventional stationary plow devices positioned along the path of travel of the packages. The labels are mechanically held against one side of the fin seal with one half the label projecting past the edge of the seal. As the packages are carried past the plow devices, the plows progressively bend the free end of the label through 180 degrees to bring it into contact with the other side of the fin seal.

Such plow arrangements work well if the material being formed is relatively rigid, but thin paper labels are too flexible and tend to fold unpredictably. As a result, the folded labels tend to be uneven, skewed, and sometimes wrinkled.

SUMMARY OF THE INVENTION

It is an object of the invention to provide improved labeling apparatus for applying a thin paper label to a fin sealed end of a package.

Another object of the invention is to provide such apparatus which includes means for folding the label over the edge of the fin seal in an accurate and precise manner.

The foregoing objects are accomplished by providing a machine comprising in combination a conveyor moving along a line serially past first and second label-folding stations, the conveyor being formed to carry a series of packages with thin fin sealed ends lying in a flat plane, means for placing a label on each fin sealed end, the label extending past the end of the fin seal, a first label-folding device at the first station including a moving plow member for folding the free end of the label at right angles to the fin seal and a second label-folding device at the second station, including a moving plow member for folding the label against the other side of the fin sealed end.

BRIEF DESCRIPTION OF THE DRAWINGS

A preferred embodiment of the invention has been chosen for purposes of illustration and description, and is shown in the accompanying drawings, forming a part of the specification wherein:

FIG. 5 is a sectional view taken along line 5—5 on FIG. 4;

FIG. 8 is a sectional view taken along line 8—8 on FIG. 4.

DESCRIPTION OF THE PREFERRED EMBODIMENT

Figure 1:
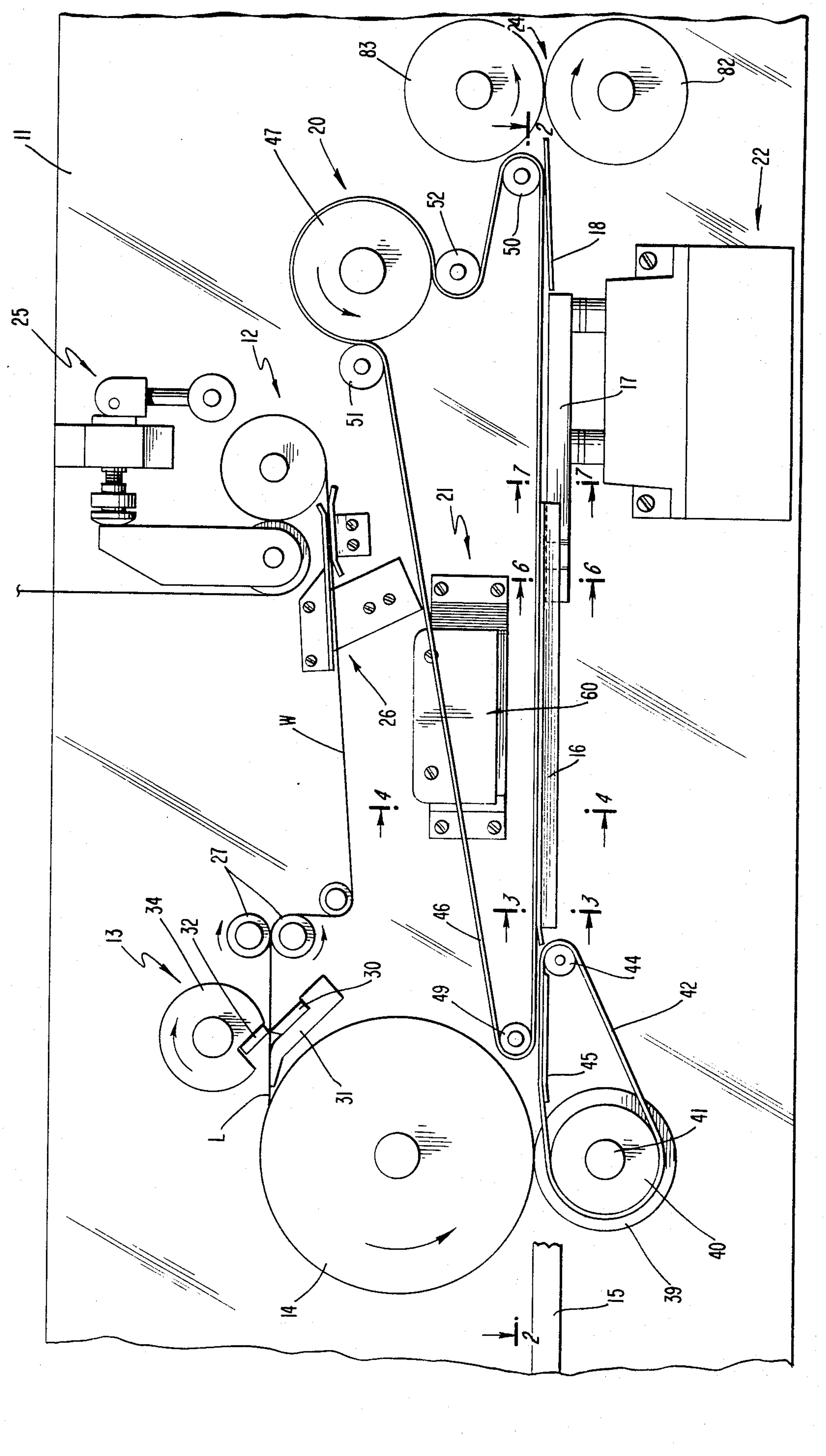
FIG. 1 is a front view of apparatus according to the present invention taken at an angle of 30 degrees above the horizontal.
Figure 2:
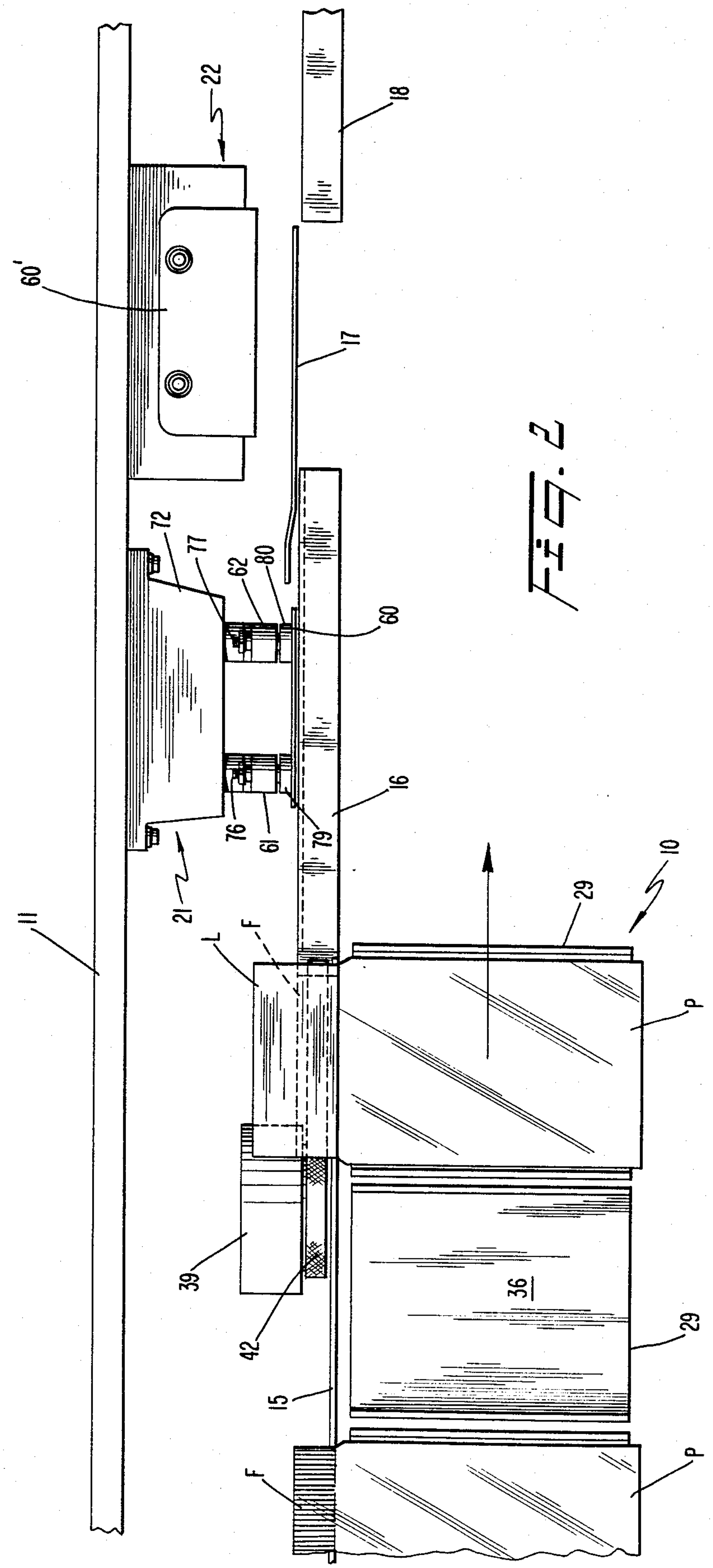
FIG. 2 is a view taken along line 2—2 on FIG. 1.

Referring to the drawings in detail, there is shown a machine according to the present invention in which a bucket conveyor 10 (FIGS. 2-4, 6 and 7) carries fin sealed packages P along the face of a frame plate 11 (FIG. 1).

As shown in FIG. 1, the frame plate 11 has mounted thereon apparatus 12 for delivering labels L in roll stock form, a cutting mechanism for cutting each label from the roll stock web W, a depositing wheel 14 for placing the labels L on the fin seals of the packages, a series of support and guide bars 15–18 positioned along the edge of the bucket conveyor, a label hold down conveyor 20, a pair of dynamic plow mechanisms 21 and 22 for folding the labels L over the ends of the fin seals F, and heat seal apparatus 24 for securing the labels in place.

The roll stock delivery apparatus includes tensioning apparatus 25, a registration sensing unit 26, and a pair of feed rolls 27 intermittently driven under the control of the registration unit 26.

The roll stock is a web of paper printed to provide a continuous strip of labels laid end to end. Each label is printed with a registration mark that is sensed by a photo cell within the unit 26.

As each registration mark is sensed by the unit 26, the rollers 27 stop briefly to allow the cutting apparatus 13 to cut the end label from the roll stock web W.

The cutting apparatus 13 includes a stationery blade 30 mounted on a label guide member 31, and a rotating blade 32 mounted on a driven wheel 34. The wheel 34 rotates to move the blade 32 past the blade 30, severing the web, each time the registration unit halts the drive rolls 27.

While each label is being cut from the web by the blades 30, 32, the free end of the label is held to the circumference of the wheel 14 by vacuum ports (not shown) provided in the outer surface of the wheel. After each cut, the wheel 14 rotates an amount sufficient to space the labels a distance equal to the separation of the fin sealed ends of the packages in the bucket conveyor.

The plate 11 leans backward at an angle of 30 degrees to the vertical. The bucket conveyor 10 is oriented with the floor of the buckets perpendicular to the plate 11. Therefore, the buckets face downwardly toward the plate 11 and the fin sealed end of the package is lower than the opposite end.

Figure 3:
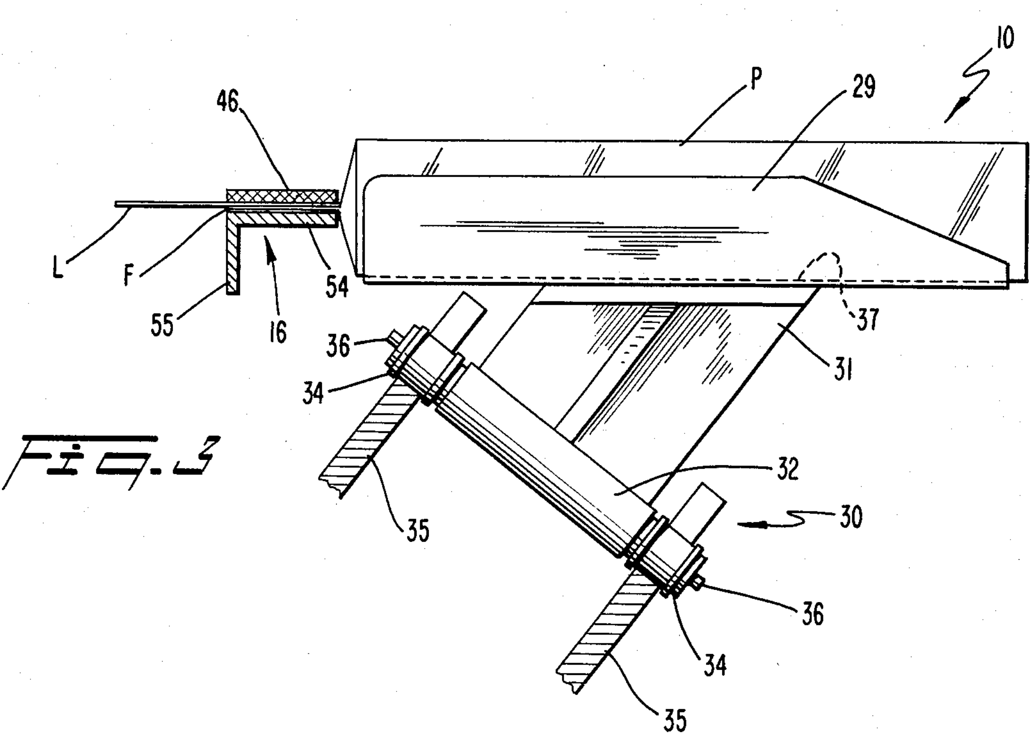
FIG. 3 is a sectional view taken along line 3—3 on FIG. 1.
Figure 4:
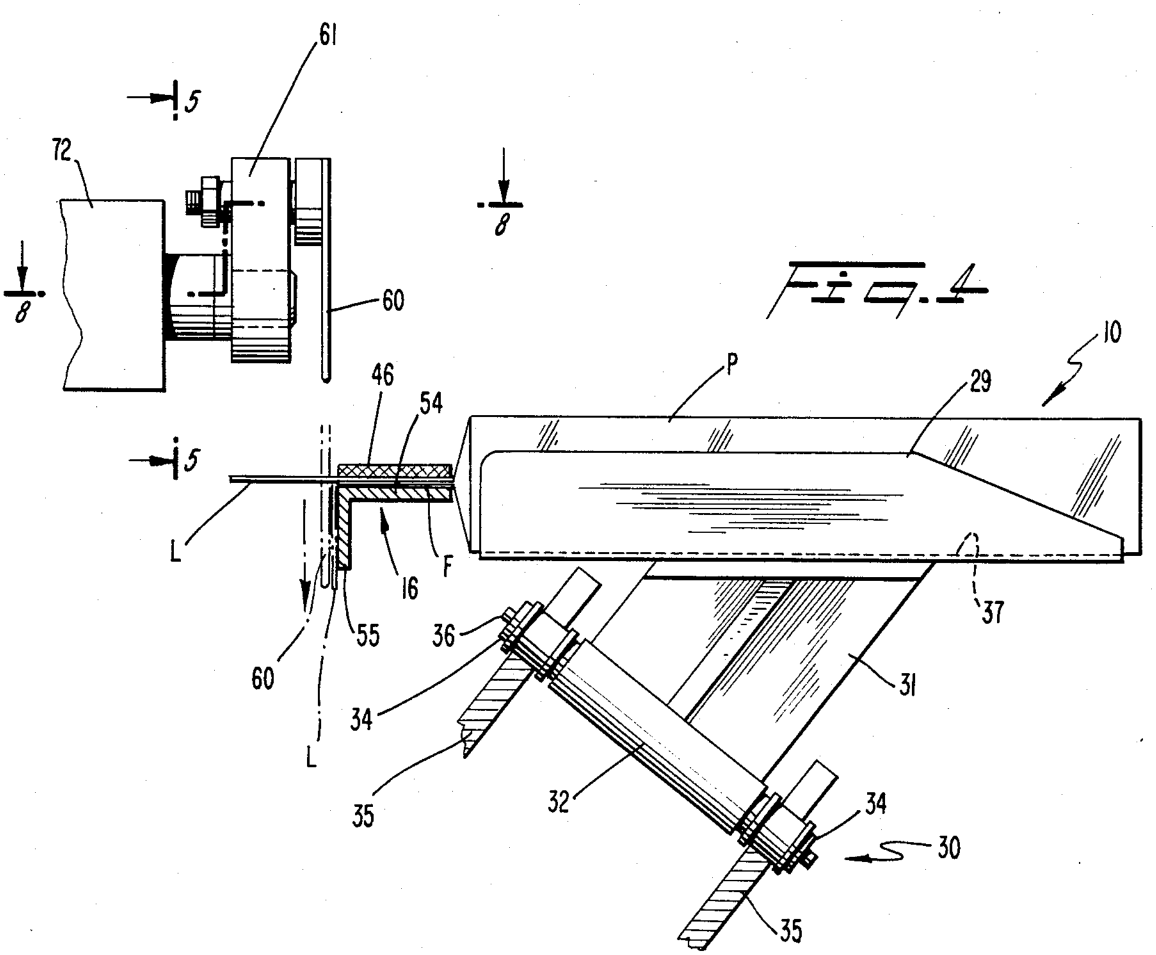
FIG. 4 is a sectional view taken along line 4—4 on FIG. 1.

As shown in FIGS. 3 and 4, the bucket conveyor 10 comprises individual buckets 29 mounted on a chain conveyor 30. The buckets 29 are supported by brackets 31 fitted with mounting bushings 32. The conveyor 30 includes two endless link chains 34 which ride on support plates 35. Rods 36 extending through the bushings 32 connect the buckets to the chains 34.

The support plates 35 extend vertically downward from the bushings 32 which are horizontally oriented. Therefore, as mentioned above, the floor 37 of the buckets 29 are inclined downwardly toward the plate 11 at an angle of 30 degrees from the horizontal.

The bar 15 (FIGS. 1 and 2) is provided to retain the packages in the buckets 29 while the labels are placed on the fin sealed ends. The lower half of the package end is in engagement with the bar 15 as the package is moved up to and past the label depositing wheel 14.

Beneath the wheel 14 is positioned a roller 39 and a conveyor wheel 40 mounted on a common driven shaft 41. A conveyor belt 42 extends from the wheel 40 to a second smaller wheel 44. A guide plate 45 is positioned under the top flight of the belt 42 beneath the inlet end of the hold down conveyor 20.

As each package moves under the wheel 14, a label carried by the wheel is rolled against the fin seal of the package. As the label passes the point of contact between the wheel 14 and the roller 39, the vacuum to the ports in the wheel 14 is broken and pressurized air is directed to the ports to positively displace the labels from the wheel.

The package fin seal with the label lying on it, is engaged by the belt 42 and moves the conveyor belt 46 of the hold down conveyor 20. The conveyor 20 includes (in addition to the belt 46) a drive wheel 47, wheels 49 and 50 spaced along the line of travel of the conveyor 10, and idler wheels 51 and 52 for insuring traction at the drive wheel.

As the packages P are moved along the face of the plate 11 by the conveyor 10, the fin sealed ends F of the packages slide along the surface of the guide 16. As shown in FIG. 3, the guide 16 is of angle iron form having legs 54 and 55. The hold down conveyor 46 holds the label L on the fin sealed end F while they move along the leg 54 of the angle member 16, past the dynamic plow 21.

Referring to FIGS. 4, 5 and 8, the dynamic plow 21 includes a plate 60 supported by a pair of arms 61, 62 each mounted on a driven shaft 64, 65. The shaft 65 is driven directly by a chain and sprocket drive 66. The shaft 64 is driven at the same speed and in the same direction as shaft 65 by means of gears 67, 69 mounted on the shafts 64, 65 respectively, and an idler gear 70 interposed between the gears 67, 69. The gear 70 is carried by a shaft 71, and the shafts 64, 65 and 71 are journalled in a base formation 72 mounted on the plate 11.

The arms 61, 62 are keyed to the driven shafts 64, 65 and carry bearing pairs 74, 75 at their opposite ends. The plate 60 is mounted to the arms 61, 62 by bolts 76, 77 journalled in the bearings 74, 75. Cup formations 79, 80 are provided on the plate 60 to receive the heads of the bolts 76, 77.

The rotation of the shafts 64 and 65 in the same direction and at the same speed, drive the arms 61, 62 synchronously. The bolts 76, 77 are equal distances from the axes of the shafts 64, 65. Therefore, the plate 60 moves in a circular path while retaining a uniform orientation throughout the motion. The leading edge 81 of the plate 60 remains parallel to the bar 16 and the label L as it descends and (as shown in FIG. 4) moves past the bar to bend the label at right angles against the leg 55 of the bar 16.

Figure 6:
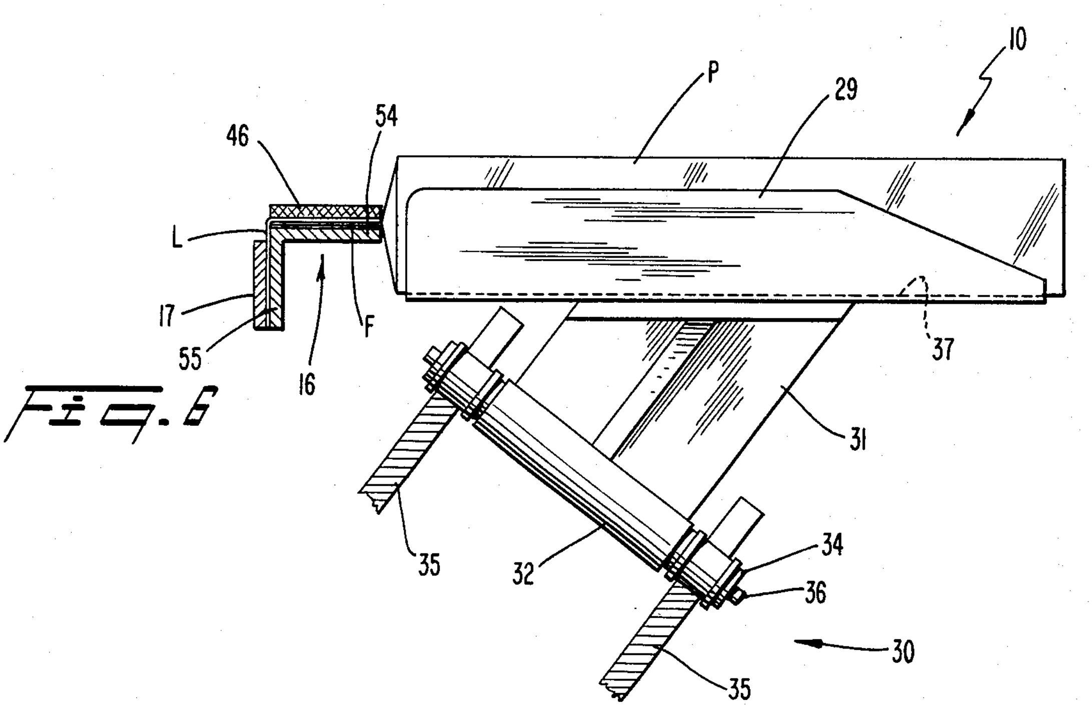
FIG. 6 is a sectional view taken along line 6—6 on FIG. 1.

While the plate 60 is moving upwardly from the lower most portion of its cycle, the conveyor 10 brings the leading end of the folded label between the guide bar 17 and the bar 16. As the package continues its travel, the guide bar 17 holds the folded portion of the label against the bar 16 (FIG. 6).

The package passes the end of the guide bar 16 when it moves into alignment with the dynamic plow 22. Except for its orientation, the dynamic plow 22 is essentially identical to the plow 21 and includes a label folding plate 60′ with a leading edge 81′ (corresponding to the plate 60 and the edge 81 of the plow 21).

Figure 7:
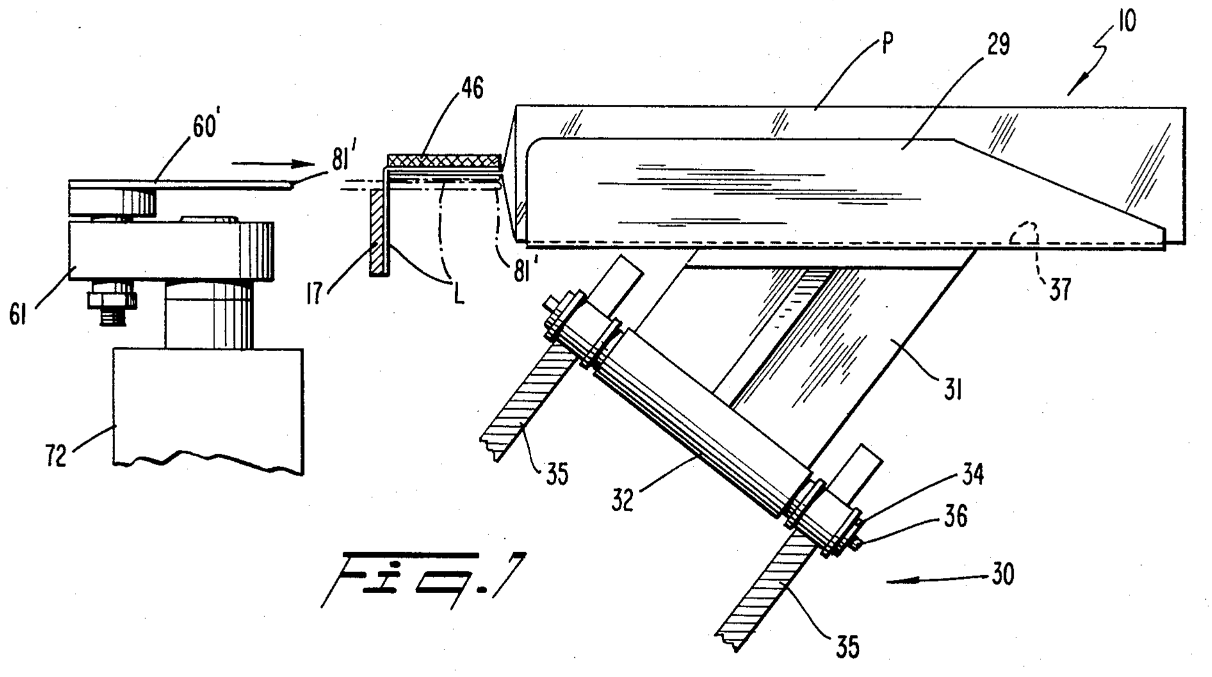
FIG. 7 is a sectional view taken along line 7—7 on FIG. 1.

As shown in FIG. 7, the plate 60′ passes between the fin sealed end F of the package P and the edge of the guide bar 17. The plate 60′ thereby presses the folded portion of the label against the under side of the fin sealed end.

As the plate 60′ draws back away from the package, the fin sealed end, not completely covered by the folded label moves onto the guide bar 18. The guide bar 18 and hold down conveyor 46 hold the label in position as the end of the package is fed between heated rollers 82, 83 of the heat seal apparatus 24. The rollers 82, 83 activate thermo plastic glue present on the unprinted surface of the label to afix the label to the fin sealed end of the package.

It will be seen from the foregoing that the present invention provides improved labeling apparatus for applying a thin paper label to a fin sealed end of a package, which includes means for folding the label over the edge of the fin seal in an accurate and precise manner.

We claim:

1. A labeling machine for applying labels to fin sealed ends of packages, comprising in combination: a conveyor moving along a line serially past first and second label folding stations, a flat surface extending parallel to said conveyor at said first folding station, and conveyor being adapted to carry a plurality of packages with their fin sealed ends lying flat on said surface, a means for placing a first portion of a label on a first side of the fin sealed end of each package as it moves toward said first label folding station, a second portion of said label extending past the edge of the fin seal, a first means for holding said labels in place on said fin sealed ends, a first label folding device at said first station including a first moving plate plow member having a generally straight label-contacting edge for engaging the label and thereby folding the free end of the label at right angles to the fin sealed end, said first label folding device having two shafts respectively fixedly connected to two arms, each arm having a portion rotatably connected to said first plow member, a means for rotatably driving at least one of said two shafts of said first label folding device, such that rotation of said at least one of said two shafts causes motion of said first plow member in a cyclical motion with said label-contacting edge of said first plow member being continuously generally parallel to a plane containing said label and moving only in a plane generally perpendicular to said first portion of said label; a second means for folding disposed between said first and second folding stations holding the folded second portion of said label at generally right angles to said fin sealed end, and a second label folding device including a second moving plate plow member having a generally straight label-contacting edge at said second folding station for engaging and thereby folding said second portion of label against a second side of said fin sealed end;

said second label folding device having two shafts respectively fixedly connected to two arms, each arm having a portion rotatably connected to said second plow member, a means for rotatably driving at least one of said two shafts of said second plow member in a cyclical motion with said label-contacting edge of said second plow member being continuously generally parallel to a plane containing said first portion of said label and moving only in a plane generally parallel to said first portion of said label;

whereby a compound fold is made in each label about fin sealed ends of packages.

2. An apparatus according to claim 1, wherein said first and second folding devices each include a means for synchronously driving said shafts in the same rotational direction.

3. An apparatus as claimed in claim 2, further comprising:

a hold-down bar holding said second portion of said label against said second side of said fin sealed end;

and a means for heating and applying pressure to said first and said second portions of said label toward one another;

whereby said label is affixed to said fin sealed end of said package.

4. Apparatus according to claim 1, wherein said labels are paper labels.

5. Apparatus according to claim 4, wherein said flat surface has one edge extending along said line and said packages are transported with the edge of the fin seals lying along said line.

6. Apparatus according to claim 5, wherein said means providing said flat surface provides a second flat surface at right angles to said first mentioned surface against which said label is folded by said first label folding device.

7. Apparatus according to claim 6, wherein said means for holding the folded label at right angles includes a bar extending along said line facing said second flat surface to label against said second flat surface.

8. Apparatus according to claim 7, wherein said bar extends into said second folding station and is spaced from the plane of said fin sealed package end to permit said plate of said second folding device to pass therebetween during the second folding operation.

9. A labeling machine for applying labels to fin sealed ends of packages, comprising in combination: a conveyor moving along a line serially past first and second label folding stations, a flat surface extending parallel to said conveyor at said first folding station said conveyor being adapted to carry a plurality of packages with their fin sealed ends lying flat on said surface, a means for placing a first portion of a label on a first side of the fin sealed end of each package as it moves toward said first label folding station, a second portion of said label extending past the edge of the fin seal, a means for holding said labels in place on the fin seals, a first label folding device at said first station including a first moving plate plow member having a generally straight label-contacting edge for engaging the label and thereby folding the free end of the label at right angles to the fin sealed end, means between said first and second folding stations for holding the folded second portion of said label at right angles to the fin sealed end and a second label folding device including a second moving plate plow member having a generally straight label-contacting edge at said second folding station for engaging and thereby folding said second portion of label against a second side of the fin sealed end, said second label folding device having two shafts respectively fixedly connected to two arms, each arm having a portion rotatably connected to said second plow member, a means for rotatably driving at least one of said two shafts of said second label folding device, such that rotation of at least one of said two shafts causes motion of said second plow member in a cyclical motion with said label-contacting edge of said second plow member being continuously parallel to a plane containing said folded second portion of said label and moving only in a plane parallel to said second side of the fin sealed end.

10. A labeling machine for applying labels to fin sealed ends of packages, comprising in combination: a conveyor moving along a line serially past first and second label folding stations, a flat surface extending parallel to said conveyor at said first folding station said conveyor being adapted to carry a plurality of packages with their fin sealed ends lying flat on said surface, a means for placing a first portion of a label on a first side of the fin sealed end of each package as it moves toward said first label folding station, a second portion of said label extending past the edge of the fin seal, a means for holding said labels in place on the fin seals, a first label folding device at said first station including a first moving plate plow member having a generally straight label-contacting edge for engaging the label and thereby folding the free end of the label at right angles to the fin sealed end, said first label folding device having two shafts respectively fixedly connected to two arms, each arm having a portion rotatably connected to said first plow member, a means for rotatably driving at least one of said two shafts of said first label folding device, such that rotation of said at least one of said two shafts causes motion of said first plow member in a cyclical motion with said label-contacting edge of said first plow member being continuously parallel to a plane containing the label and moving only in a place perpendicular to said first portion of said label; a means between said first and second folding stations for holding the folded second portion of said label at right angles to the fin sealed end and a second label folding device including a second moving plate plow member having a generally straight label-contacting edge at said second folding station for engaging and thereby folding said second portion of label against a second side of the fin sealed end said second label folding device having two shafts respectively fixedly connected to two arms, each arm having a portion rotatably connected to said second plow member, a means for rotatably driving at least one of said two shafts of said second label folding device, such that rotation of at least one of said two shafts causes motion of said second plow member in a cyclical motion with said label-contacting edge of said second plow member being continuously parallel to a plane containing said folded second portion of said label and moving only in a plane parallel to said second side of the fin sealed end.

* * * * *